(12) United States Patent
Weiberle et al.

(10) Patent No.: US 6,374,171 B2
(45) Date of Patent: Apr. 16, 2002

(54) APPARATUS AND METHOD FOR DETERMINING VEHICLE OPERATING AND DYNAMIC PARAMETERS

(75) Inventors: Reinhard Weiberle, Vaihingen/enz; Matthias Schanzenbach, Eberstadt, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/836,732

(22) Filed: Apr. 17, 2001

(30) Foreign Application Priority Data

Apr. 17, 2000 (EP) .............................. 00107952

(51) Int. Cl.[7] .............................................. B60B 39/00
(52) U.S. Cl. ............................... 701/71; 701/72; 701/74
(58) Field of Search .............................. 701/71, 72, 74, 701/75, 69, 82; 180/197; 280/757

(56) References Cited

U.S. PATENT DOCUMENTS 5,183,127 A    2/1993   Hirotaka et al.

FOREIGN PATENT DOCUMENTS

| DE | 40 39 629   | 6/1992  |
|----|-------------|---------|
| DE | 42 28 414   | 3/1994  |
| EP | 0 345 817   | 12/1989 |
| JP | 03 167060   | 7/1991  |
| JP | 05 097024   | 4/1993  |
| WO | WO 92/10377 | 6/1992  |

*Primary Examiner*—Richard M. Camby
(74) *Attorney, Agent, or Firm*—Kenyon & Kenyon

(57) ABSTRACT

The invention describes an apparatus and method for determining at least one wheel slip of a vehicle and at least one of a pitch angle, a road angle, a roll angle for use in at least one vehicle control system. The method and apparatus are characterized in that at least three deflection displacements are determined, and then at least one wheel slip of the vehicle and at least one of the pitch angle, the road angle, the roll angle of the vehicle are determined based on the at least three deflection displacements. The wheel slip(s) of the vehicle and at least one of the pitch angle, the road angle, and the roll angle of the vehicle may be provided or otherwise made available to the at least one vehicle control system.

22 Claims, 7 Drawing Sheets

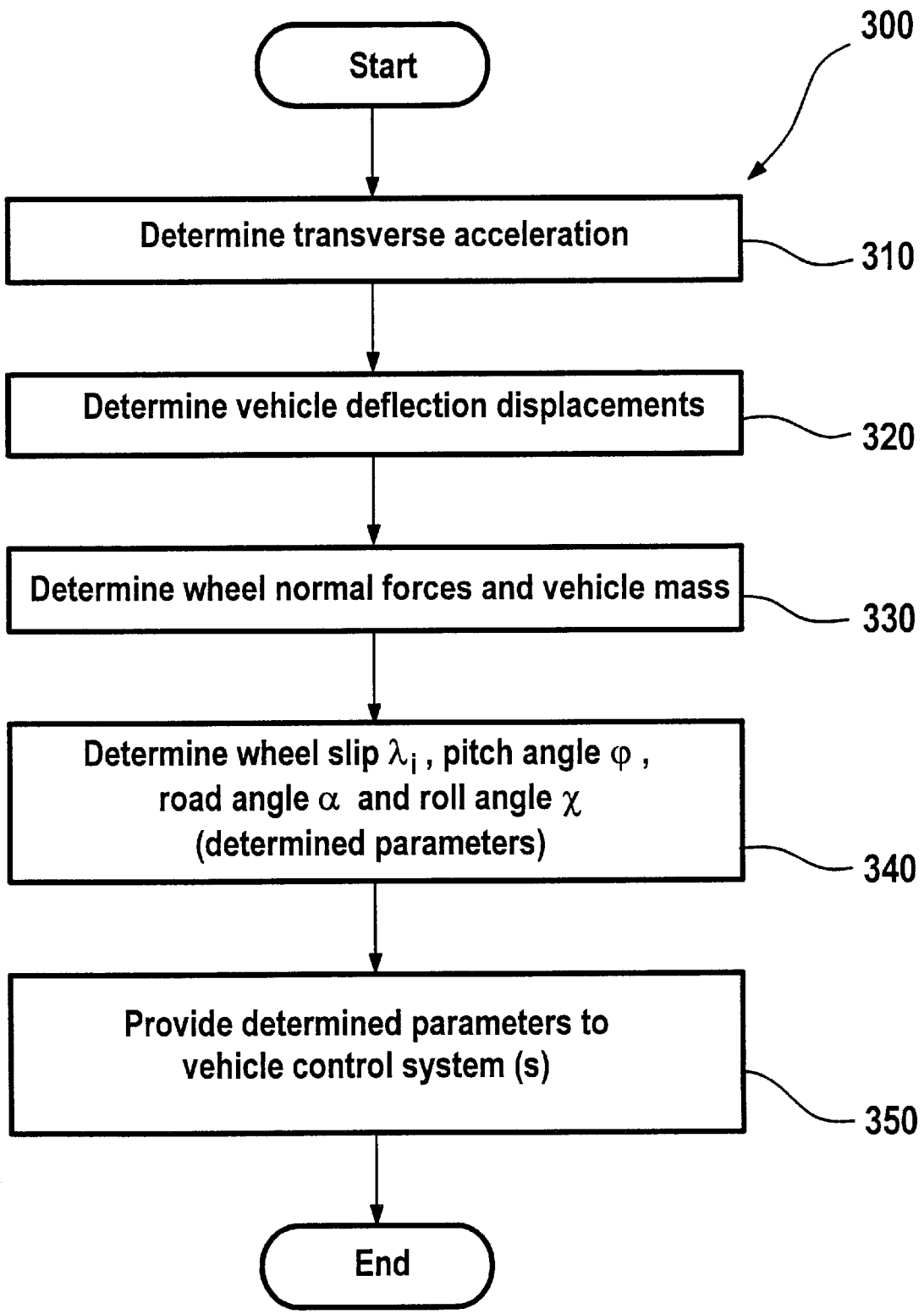

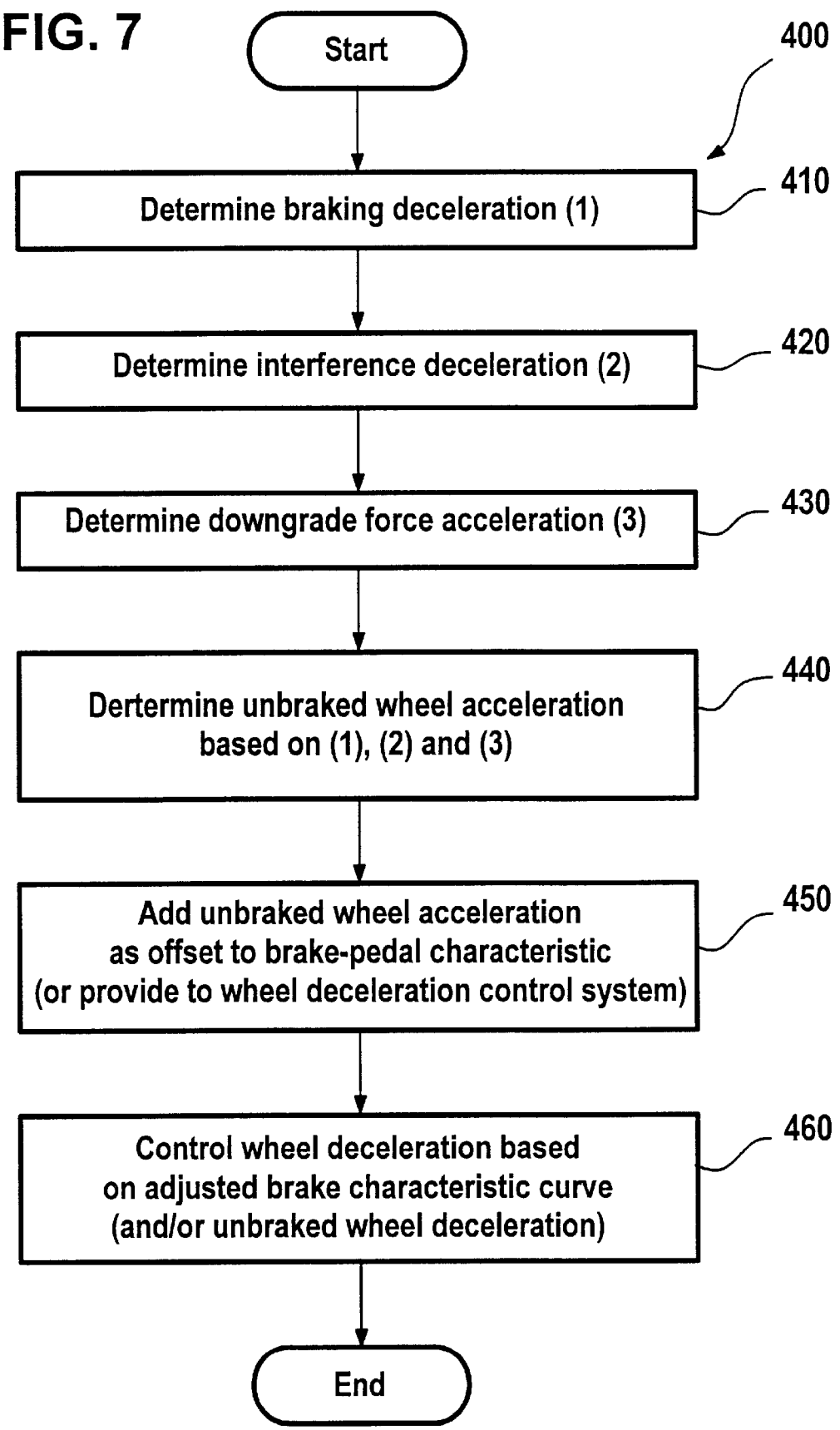

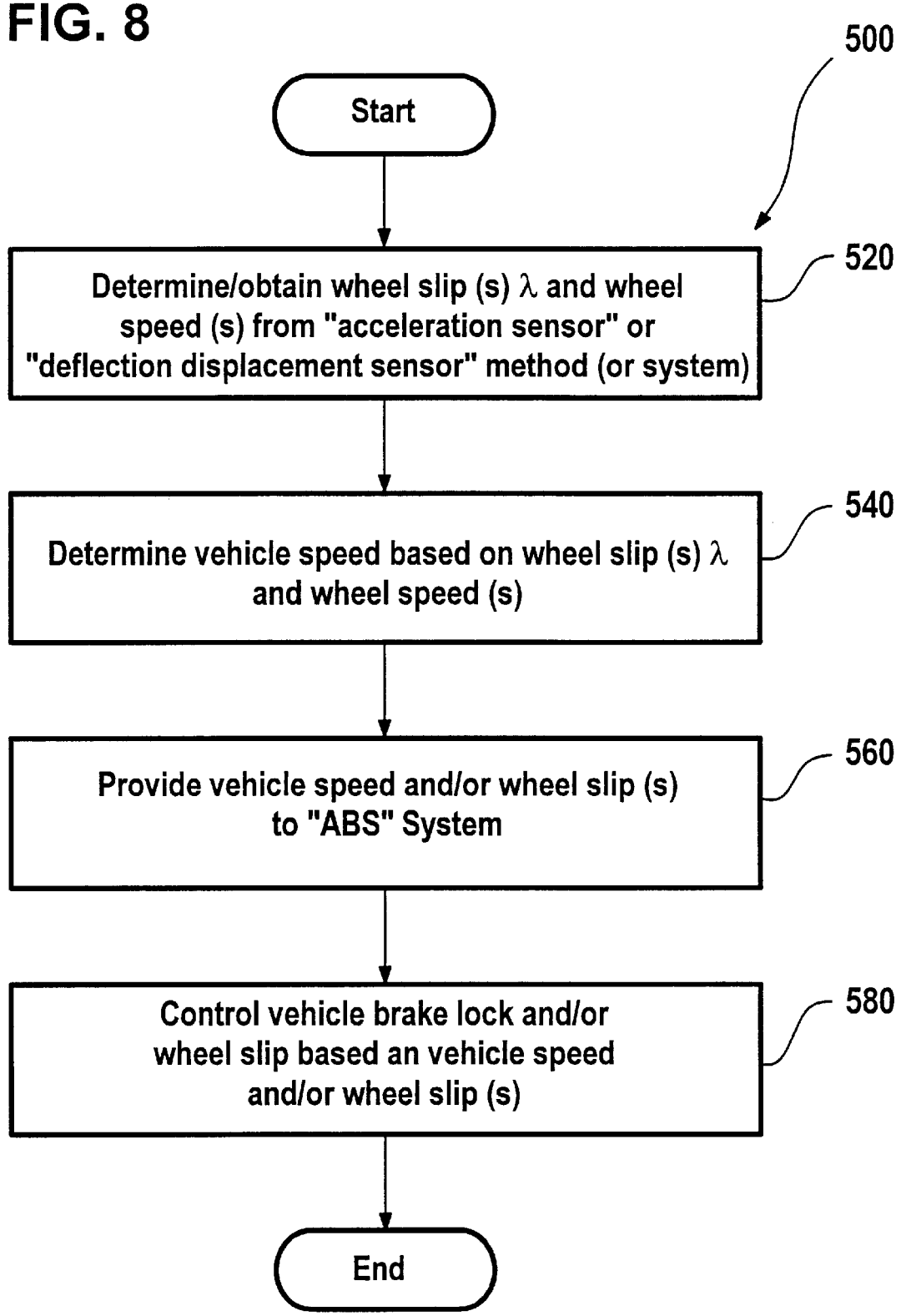

APPARATUS AND METHOD FOR DETERMINING VEHICLE OPERATING AND DYNAMIC PARAMETERS

The present invention concerns, in part, an apparatus as defined in the preambles of claims 1and 10, and a method as defined in the preamble of claim 15.

Each of commonly assigned patent references DE 40 39 629 C2 (which has a corresponding PCT reference WO 92/10377) and DE 42 28 414 A1 relate to devices and methods in the field of regulating vehicle dynamics or movements. According to an abstract of DE 40 39 629 C2, it concerns a system for generating signals for adjusting or controlling a vehicle body. To reduce certain movements of the vehicle, speed sensor signals and suspension deflection sensor signals are involved in determining the vehicle speed and the longitudinal and transverse vehicle accelerations. Vehicle movements, which may include "proper" swinging, pitching-or-rolling movements and "proper" vertical displacements of the front and rear of the vehicle, are involved in compensating or controlling the vehicle suspension systems. Additionally, according to an abstract of DE 42 28 414 A1, a signal processing system detects a first set of signals that represent the movement of the vehicle relative to a fixed reference system, and uses these signals to provide a corresponding set of corrected signals for a travel path of the vehicle. In particular, the sensor signals may represent the transverse velocity and the longitudinal, transverse and vertical accelerations of the vehicle. As discussed in the abstract, the system may be used to control or regulate an active vehicle suspension system, and may correct for certain vehicle movements relative to an inclined path that may be associated with the gravitational acceleration components of the measured signals.

Vehicle brake-by-wire systems, such as, for example, electromechanical brake systems or electro-hydraulic brake systems, may be equipped with wheel braking force control, wheel braking torque control or other anti-lock brake control systems, and may also be provided with a deceleration control system. In a deceleration control system of a brake-by-wire system, there may be no fixed setpoint value for a wheel deceleration that may be associated or correlated with a particular level of brake-pedal travel or brake-pedal force that corresponds with the experience or experiential frame of reference of a driver. Accordingly, a deceleration control system may present certain problems in determining or obtaining an expected or setpoint deceleration value for a particular point on a "driver" or a "brake pedal operation" characteristic curve. It is believed that this is because in such a deceleration control system or "deceleration pedal" braking system, an unpressed brake pedal may correspond to a wheel deceleration of zero (0) and an actuated or depressed brake pedal may correspond to a wheel acceleration that is less than zero (0). In particular, one problem that may occur, for example, is when a driver is driving down a hill. In such a case, the driver may achieve wheel acceleration even while depressing the brake pedal. Any such wheel acceleration, of course, should be less than the wheel acceleration that might result if the driver did not actuate or depress the brake pedal. That is, when driving down a hill, the vehicle may accelerate more if the brake pedal is not actuated or depressed. If the driver increases the force on the brake pedal, this should reduce wheel acceleration to zero (0) and eventually make it negative so that there is wheel deceleration, rather than wheel acceleration.

This braking behavior may be simulated by determining an instantaneous unbraked wheel acceleration and adding it as an offset to a characteristic curve of the "brake pedal operation" for a driver. If the unbraked wheel acceleration offset is not determined during actual braking conditions, however, then the characteristic curve of the "brake pedal operation" may depart (in a possibly dangerous manner or way) from the experience or experiential frame of reference of the driver. For example, when driving off of a car transporter ramp, for example, or down some other incline, a driver may brake on the ramp or other inclined surface to adjust the deceleration to zero (0). The offset that is determined or obtained, however, may be for an accelerating vehicle. Accordingly, if the same operation of the brake pedal is used to adjust the deceleration to zero (0) after the vehicle moves to a relatively level surface, then the brakes may open or otherwise become ineffective. Since the driver may not decelerate by depressing the brake pedal while on a level road, this result may be inconsistent with the experiential frame of reference of the driver.

As further regards the implementation of a wheel deceleration control systems and/or an anti-lock brake system control system, such an implementation may be problematic since the controlled deceleration of the wheels may make it impractical for the wheel speed sensors to measure the wheel speeds when the wheel speeds are dropping relatively sharply because of relatively high wheel decelerations. In this regard, FIG. 1 shows a graph of wheel deceleration control at low friction values ($\mu$), in which $V_{fahrzeug}$ corresponds to a vehicle speed or velocity $V_{vehicle}$, $V_{Rad,\ soll}$ corresponds to a desired wheel speed $V_{wheel-desired}$ and $V_{Rad,\ ist}$ corresponds to an actual wheel speed $V_{wheel-actual}$. In particular, FIG. 1 shows deceleration control at low friction values ($\mu$), in which the actual wheel speed conforms to the desired wheel speed, and in which the wheel slip becomes increasingly greater until the wheel locks when a vehicle speed is not zero (0).

In certain anti-lock brake control systems, wheel locking may be detected by comparing the vehicle speed with the wheel speeds. As a practical matter, however, wheel slip and other factors may complicate the process of detecting or determining the actual vehicle speed or velocity. Accordingly, in certain anti-lock brake control systems, vehicle speed may be determined approximately based on each of the wheel speeds. Thus, for example, the output of a wheel speed sensor on each wheel may be provided to a processor for an anti-lock brake control system, in which the wheel speeds are compared to determine an estimated vehicle speed. The estimated vehicle speed may, of course, be differentiated to determine the vehicle acceleration or deceleration. If any wheel (or set of wheels) exceeds or drops below some predetermined velocity rate and/or acceleration rate, a correcting control signal may be applied to the braking system to compensate for any locking or slipping of a wheel. Accordingly, if a more accurate vehicle velocity—which depends on the wheel slip(s), could be determined, it is believed that a more accurate or efficient anti-lock braking control system may be provided.

The method and apparatus of some exemplary embodiments of the present invention are characterized in that a plurality of deflection displacements are determined, and then at least one wheel slip of a vehicle and at least one of a pitch angle, a road angle, and a roll angle of the vehicle are determined based on the plurality of deflection displacements. Also, at least one wheel slip of a vehicle and at least one of the pitch angle, the road angle, and the roll angle of the vehicle may be provided or otherwise made available to at least one vehicle control system.

In view of the above needs and problems, one embodiment of the present invention is directed to an apparatus for determining at least one wheel slip of a vehicle and at least one of a pitch angle, a road angle and a roll angle of the vehicle for use in at least one vehicle control system, characterized in that the apparatus includes: at least three sensing devices that are adapted for sensing a first parameter that corresponds to a longitudinal acceleration, a second parameter that corresponds to a transverse acceleration, and a third parameter that corresponds to a vertical acceleration; and a processor that determines the at least one wheel slip of the vehicle and the at least one of the pitch angle, the road angle and the roll angle based on the longitudinal acceleration, the transverse acceleration and the vertical acceleration. The at least one wheel slip of the vehicle and the at least one of the pitch angle, the road angle, and the roll angle of the vehicle may be provided to the at least one vehicle control system.

Another embodiment of the present invention is directed to a method for determining at least one wheel slip of a vehicle and at least one of a pitch angle, a road angle and a roll angle for use in at least one vehicle control system, characterized in that the method includes the steps of: determining a longitudinal acceleration; determining a transverse acceleration; determining a vertical acceleration; and determining the at least one wheel slip of the vehicle and the at least one of the pitch angle, the road angle and the roll angle based on the longitudinal acceleration, the transverse acceleration and the vertical acceleration. The at least one wheel slip of the vehicle and the at least one of the pitch angle, the road angle, and the roll angle of the vehicle may be provided to the at least one vehicle control system.

Still another embodiment of the present invention is directed to an apparatus for determining at least one wheel slip of a vehicle and at least one of a pitch angle, a road angle and a roll angle of the vehicle for use in at least one vehicle control system, including a deceleration control system, which has a braking characteristic curve, that controls a brake system based on at least one of the braking characteristic curve and an unbraked wheel acceleration, characterized in that the apparatus includes: means for sensing a first parameter that corresponds to a longitudinal acceleration, a second parameter that corresponds to a transverse acceleration, and a third parameter that corresponds to a vertical acceleration; means for determining the at least one wheel slip based on at least one of the longitudinal acceleration, the transverse acceleration and the vertical acceleration; means for determining the road angle and at least one of the pitch angle and the roll angle based on at least one of the longitudinal acceleration, the transverse acceleration and the vertical acceleration; and means for determining the unbraked wheel acceleration during a braking operation and adding the unbraked wheel acceleration as an offset to the braking characteristic curve.

Yet another embodiment of the present invention is directed to an apparatus for determining at least one wheel slip of a vehicle and at least one of a pitch angle, a road angle and a roll angle of the vehicle for use in at least one vehicle control system, characterized in that the apparatus includes: at least three deflection displacement sensing devices that are adapted for sensing a first parameter that corresponds to a first deflection displacement, a second parameter that corresponds to a second deflection displacement, and at least a third parameter that corresponds to a third deflection displacement; and a processor for determining the at least one wheel slip of the vehicle and the at least one of the pitch angle, the road angle and the roll angle based on the first deflection displacement, the second-deflection displacement, and the third deflection displacement. The at least one wheel slip of the vehicle and the at least one of the pitch angle, the road angle, and the roll angle of the vehicle may be provided to the at least one vehicle control system.

Still another embodiment of the present invention is directed to a method for determining at least one wheel slip of a vehicle and at least one of a pitch angle, a road angle and a roll angle for use in at least one vehicle control system, characterized in that the method includes the steps of: determining a first deflection displacement; determining a second deflection displacement; determining a third deflection displacement; and determining the at least one wheel slip of the vehicle and the at least one of the pitch angle, the road angle and the roll angle based on the first deflection displacement, the second deflection displacement, and the third deflection displacement. The at least one wheel slip of the vehicle and the at least one of the pitch angle, the road angle, and the roll angle of the vehicle may be provided to the at least one vehicle control system.

Yet another embodiment of the present invention is directed to an apparatus for determining at least one wheel slip of a vehicle and at least one of a pitch angle, a road angle and a roll angle of the vehicle for use in at least one vehicle control system, including a deceleration control system, which has a braking characteristic curve, that controls a brake system based on at least one of the braking characteristic curve and an unbraked wheel acceleration, characterized in that the apparatus includes: means for sensing a first parameter that corresponds to a first deflection displacement, a second parameter that corresponds to a second deflection displacement, and at least a third parameter that corresponds to at least a third deflection displacement; means for determining the at least one wheel slip based on at least one of first deflection displacement, the second deflection displacement, and the third deflection displacement; means for determining the at least one wheel slip based on at least one of first deflection displacement, the second deflection displacement, and the third deflection displacement; means for determining the road angle and at least one of the pitch angle and the roll angle based on at least one of first deflection displacement, the second deflection displacement, and the third deflection displacement; and means for determining an unbraked wheel acceleration during a braking operation and adding the unbraked wheel acceleration as an offset to the braking characteristic curve.

Further advantages of the present invention(s) are also evidenced by the claims, including the dependent claims, and the present description, including the referenced Figures.

The present invention(s) are described and explained in detail with respect to the exemplary embodiments and to the referenced Figures.

FIG. 1 shows a graph of wheel deceleration control at low friction values ($\mu$), in which $V_{fahrzeug}$ corresponds to a vehicle speed or velocity $V_{vehicles}$, $V_{Rad,\ soll}$ corresponds to a desired wheel speed $V_{wheel-desired}$ and $V_{Rad,\ ist}$ corresponds to an actual wheel speed $V_{wheel-actual}$.

FIG. 2 shows a two (2) dimensional schematic of a vehicle 10, which has a center of gravity "SP", and which has front wheels 20, rear wheels 30 and rear wheel springs 31 (the front wheel springs are not shown).

FIG. 6 shows a deflection displacement sensor method for determining vehicle wheel slip(s) and other vehicle dynamic parameters, including the wheel normal forces and the vehicle mass.

FIG. 7 shows a deceleration control method that uses either the acceleration sensor method of FIG. 5 or the deflection displacement sensor method of FIG. 6 for determining the unbraked wheel acceleration, as well as other vehicle dynamic parameters, including the vehicle wheel slip(s) and the road angle.

FIG. 8 shows a wheel slip braking control method that uses either the acceleration sensor method of FIG. 5 or the deflection displacement sensor method of FIG. 6 for determining the vehicle wheel slip(s), as well as other vehicle dynamic parameters, including the road angle.

To discuss the apparatus and method of the present invention, some of the definitions or parameters that are used are as follows:

| | |
|---|---|
| l = | wheelbase length; |
| $S_{spur}$ = | track width; |
| h = | height of center of gravity; |
| m = | vehicle mass; |
| $a_{laengs}$ ($\tilde{a}_{laengs}$) = | longitudinal acceleration (adjusted longitudinal acceleration); |
| $a_{quer}$ = | transverse acceleration; |
| $a_{vert}$ = | vertical acceleration; |
| g = | gravitational acceleration; |
| γ = | angle of the vertical axis to the direction in which the gravitational acceleration acts; |
| $α_{laengs}$ = | road angle in the vehicle's longitudinal direction (where up corresponds to a negative value, and down corresponds to a positive value); |
| $α_{quer}$ = | road angle in the vehicle's transverse direction; |
| χ = | roll angle; |
| φ = | pitch angle; |
| ψ = | yaw angle; |
| $δ_{lenkung}$ ($δ_l$) = | steering angle; and |
| β = | attitude angle. |

Additionally, some further definitions and parameters are as follows:

| | |
|---|---|
| $a_{zentripetal}$ = | centripetal acceleration; |
| $a_{stoer}$ = | interference acceleration associated with the air resistance (negative in the direction of $v_{fzg}$); |
| $l_v$ = | distance from the front axle to the center of gravity of the vehicle; |
| $l_h$ = | distance from the rear axle to the center of gravity of the vehicle; |
| $F_{Nk}$ = | wheel normal force (normal force on k-th wheel); |
| $v_{fzg}$ = | relative speed of the vehicle; |
| $x_f$ = | deflection displacement associated with a wheel spring(s) of the vehicle; |
| $Δx_{f\_nick}$ = | difference between the deflection displacement of the wheel springs of the front and rear axles of the vehicle; and |
| $Δx_{f\_wank}$ = | difference between the deflection displacement of the wheel springs of the left and right sides of the vehicle. |

Figure 1:
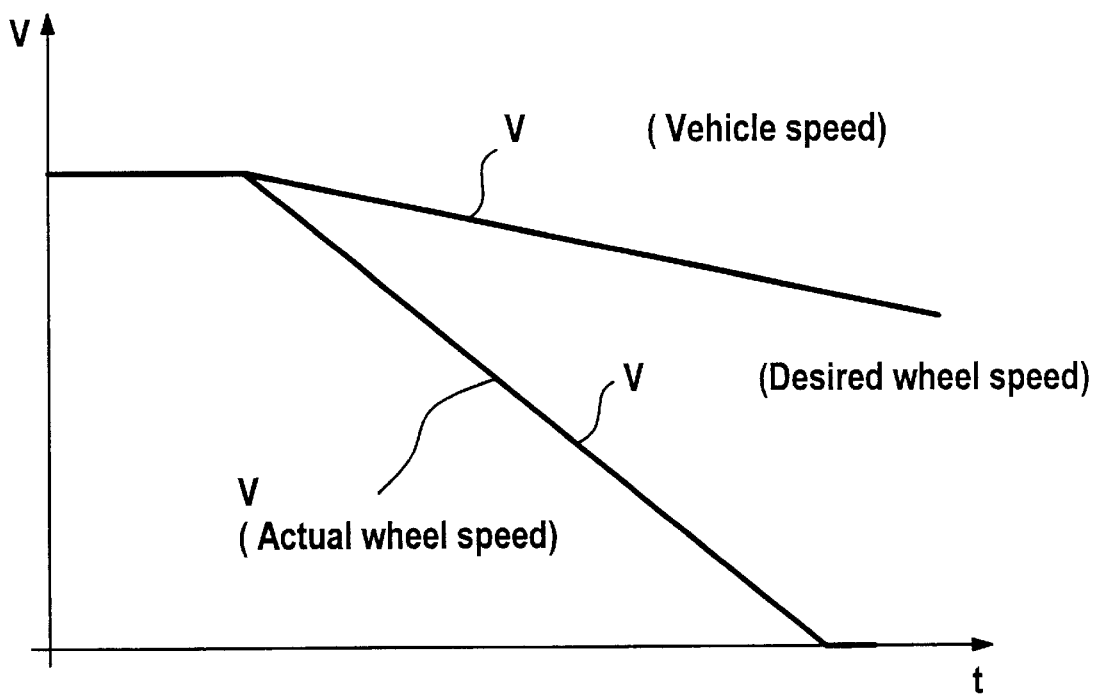
Figure 2:
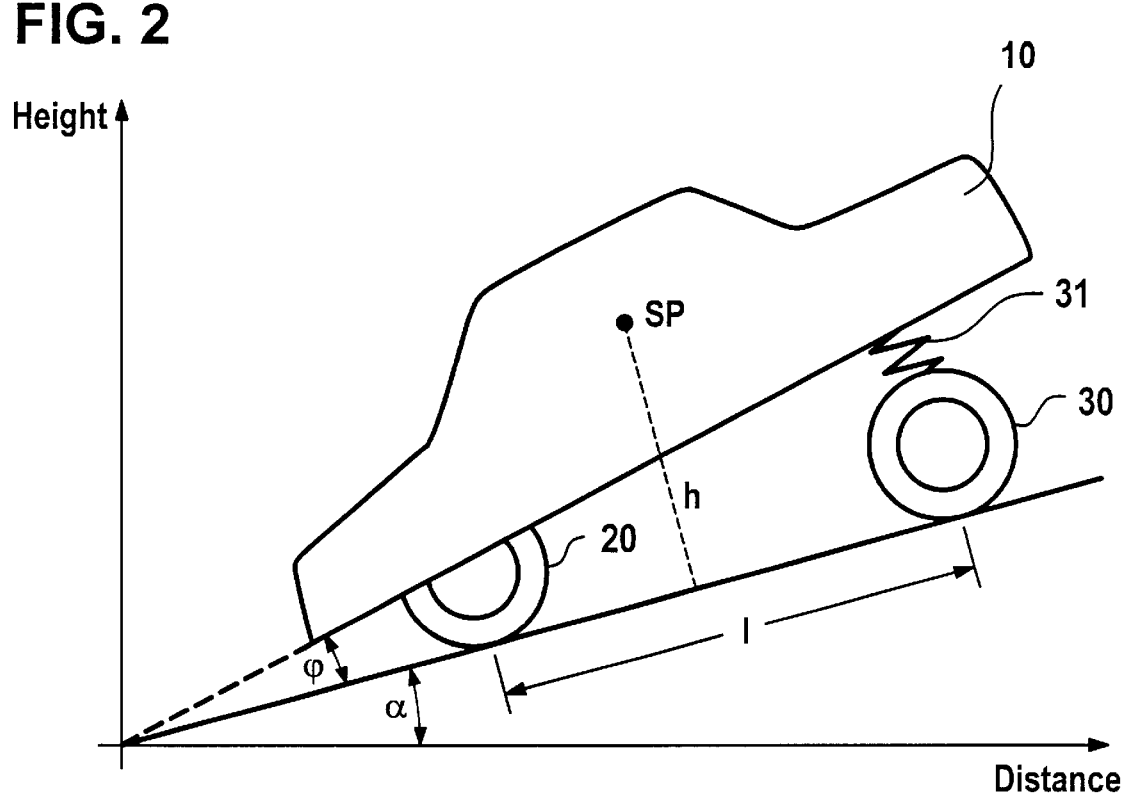

In one approach or method, at least three acceleration sensors, which may be mounted perpendicularly to one another, may be used to determine the braking slip at each of the vehicle wheels and the road angle, as well as other dynamic parameters, such as the pitch angle and the road angle. Preferably, the acceleration sensors should be positioned as close as is practical to the vehicle's center of gravity to reduce or at least limit certain dynamic acceleration effects. In this regard, FIG. 2 shows a two (2) dimensional schematic of a vehicle 10, which has a center of gravity "SP", and which has front wheels 20, rear wheels 30 and rear wheel springs 31 (the front wheel springs are not shown).

As discussed below, if used with an electronic stability (program) control system (ESP, FDR or other suitably appropriate vehicle control system) that has a transverse acceleration sensor, then only two additional acceleration sensors may be required. While the apparatus and method described below may, of course, make use of certain electronic stability (program) control (ESP, FDR or other vehicle control system) sensor signals (which may exclude the pre-control pressure sensor) so that only two additional acceleration sensors are required, the apparatus and method may, of course, be implemented without using such systems by providing at least three acceleration sensors or some other suitably appropriate sensor arrangement.

For the longitudinal acceleration sensor, which is oriented or positioned in the vehicle's longitudinal direction:

$$a_{laengs\_sensor}=g \cdot \sin(\phi+a_{laengs})+\alpha_{laengs} \cdot \cos(\phi)+a_{vert} \cdot \sin(\phi) \quad (1).$$

Thus, the longitudinal acceleration sensor signal depends on the pitch angle φ and the road angle α, and not on the vehicle's roll angle χ. This is because the rolling motion occurs in a plane that is perpendicular to the direction in which the longitudinal acceleration $a_{laengs}$ is sensed.

For the transverse acceleration sensor, which is oriented or positioned in the vehicle's transverse direction:

$$a_{quer\_sensor}=g \cdot \sin(\chi+a_{quer})+a_{quer} \cdot \cos(\chi)+a_{vert} \cdot \sin(\chi) \quad (2).$$

Finally, for the vertical acceleration sensor, which is oriented or positioned in the direction of the vehicle's vertical axis:

$$a_{vert\_sensor}=g \cdot \cos(\gamma)-a_{quer} \cdot \sin(\chi)-a_{laengs} \cdot \sin(\phi)+a_{vert} \cdot \cos(\delta_l) \quad (3),$$

where $δ_l$ represents the angle of the vehicle's vertical axis to a normal line of the driving plane and γ represents the angle of the vertical axis to the direction in which the gravitational acceleration "g" acts. The longitudinal acceleration $a_{laengs}$ may be determined as follows:

$$a_{laengs}=a_{brems} \cdot \cos(\beta)+a_{stoer} \cdot \cos(\beta)+a_{zentripetal} \cdot \sin(\beta) \quad (4).$$

Since $a_{laengs}$ is in the direction of the vehicle's longitudinal axis, the adjusted longitudinal acceleration $\tilde{a}_{laengs}$ and the transverse acceleration $a_{quer}$ may be determined as follows:

$$\tilde{a}_{laengs}=a_{brems} \cdot \cos(\beta)+a_{zentripetal} \cdot \sin(\beta) \quad (4a);$$

$$a_{quer}=a_{brems} \cdot \sin(\beta)+a_{stoer} \cdot \sin(\beta)+a_{zentripetal} \cdot \cos(\beta) \quad (5).$$

Using, for example, the methods in an electronic stability program control system (such as ESP, FDR or some other suitably appropriate vehicle control system), the attitude angle β may be determined as is known, for example, from van A. Zanten, R. Erhardt, G. Pfaff, F. Kost, T. Ehret, U. Hartmann, Control Aspects of the Bosch-VDC, AVEC '96, International Symposium on Advanced Vehicle Control at Aachen University of Technology, 1996 ("the AVC reference"), and is therefore not discussed any further.

As to determining the angle γ, it may be determined as follows:

The sum of the pitch angle φ and the longitudinal road angle $α_{laengs}$ represents the projection of a sensor position in the x-z plane, and the sum of the roll angle $\chi$ and the transverse road angle $\alpha_{quer}$ represents the projection of the sensor position onto the y-z plane. Accordingly, the resulting position of the sensor may be obtained by the intersection of two planes. A first plane E1 runs parallel to the y-axis and has the slope of the projection onto the x-z plan, and a second plane E2 runs parallel to the x-axis and has the slope of the projection in the y-z plane. The result is a line that describes the direction of action on the vertical sensor and a resulting angle $\gamma$ of the vertical axis to the direction in which the gravitational acceleration acts.

The first plane E1 is composed of two directions and one point P1, as follows:

$$P1 = \begin{pmatrix} 0 \\ 0 \\ 0 \end{pmatrix} \quad \overline{a} = \begin{pmatrix} 0 \\ 1 \\ 0 \end{pmatrix} \quad \overline{a} = \begin{pmatrix} z \cdot \tan(\alpha_{laengs} + \varphi) \\ 0 \\ z \end{pmatrix}, \text{ and}$$

$$E1: \ \overline{x} = \begin{pmatrix} 0 \\ t_1 \\ 0 \end{pmatrix} + S_1 \cdot \begin{pmatrix} z \cdot \tan(\alpha_{laengs} + \varphi) \\ 0 \\ z \end{pmatrix}.$$

The second plane E2 is also composed of two directions and one point P2, as follows:

$$P2 = \begin{pmatrix} 0 \\ 0 \\ 0 \end{pmatrix} \quad \overline{a} = \begin{pmatrix} 1 \\ 0 \\ 0 \end{pmatrix} \quad \overline{a} = \begin{pmatrix} 0 \\ z \cdot \tan(\alpha_{quer} + \chi) \\ z \end{pmatrix}, \text{ and}$$

$$E2: \ \overline{x} = \begin{pmatrix} t_2 \\ 0 \\ 0 \end{pmatrix} + S_2 \cdot \begin{pmatrix} 0 \\ z \cdot \tan(\alpha_{quer} + \chi) \\ z \end{pmatrix}.$$

The intersection of the two planes, namely planes E1 and E2, provides the following:

$$S_1 \cdot z \tan(\alpha_{laengs} + \varphi) = t_2;$$

$$t_1 = S_2 \cdot z \cdot \tan(\alpha_{quer} + \chi);$$

and $$S_1 \cdot z = S_2 \cdot z.$$

It therefore follows that: $t_1 = S_1 \cdot z \cdot \tan(\alpha_{quer} + \chi)$, and substitution into the plane equation provides the following:

$$G: \ \overline{x} = s \cdot \begin{pmatrix} \tan(\alpha_{laengs} + \varphi) \\ \tan(\alpha_{quer} + \chi) \\ 1 \end{pmatrix}.$$

Additionally, the angle ("winkel") between the direction in which the gravitational acceleration acts and the direction of action on the sensor may be determined as follows:

$$\overline{x} \cdot \overline{n}_z = |\overline{x}| \cdot |\overline{n}_z| \cdot \cos(\text{winkel}(\overline{x}, \overline{n}_z)) \Rightarrow \text{winkel}(\overline{x}, \overline{n}_z) = \gamma$$

$$= \arccos\left( \frac{S\begin{pmatrix} \tan(\alpha_{laengs} + \varphi) \\ \tan(\alpha_{quer} + \chi) \\ 1 \end{pmatrix} \cdot \begin{pmatrix} 0 \\ 0 \\ 1 \end{pmatrix}}{S \cdot (\tan^2(\alpha_{laengs} + \varphi) + \tan^2(\alpha_{quer} + \chi) + 1)} \right)$$

Thus, the angle $\gamma$ may be determined as follows:

$$\gamma = \arccos\left( \frac{1}{\tan^2(\alpha_{laengs} + \varphi) + \tan^2(\alpha_{quer} + \chi) + 1} \right). \quad (6)$$

The steering angle $\delta_l$ is determined, in a corresponding way, as follows:

$$\delta_l = \arccos\left( \frac{1}{\tan^2(\varphi) + \tan^2(\chi) + 1} \right). \quad (7)$$

Furthermore, the centripetal acceleration, based on the instantaneous speed and the radius of curvature that is traveled, may be determined as follows:

$$a_{zentripetal} = \frac{v_{fzg}^2}{r_{kurve}}. \quad (8)$$

Based on the wheel speeds and the wheel slip(s), the wheel hub speed may be determined as follows:

$$v_{nabe,i} = \frac{1}{1 - \lambda_i} \cdot v_{rad,i}. \quad (9a)$$

The vehicle speed may be determined based on the wheel speeds, the braking slip(s), and the yaw speed. Accordingly, the vehicle speed at the center of gravity of the vehicle may be determined as follows:

$$v_{fzg} = \frac{1}{1 - \lambda_i} \cdot v_{rad,i} \pm \frac{S_{spur}}{2} \cdot \dot{\psi}. \quad (9)$$

The radius of curvature may be determined based on the vehicle speed $v_{fzg}$, the steering angle $\delta_{lenkung}$, the wheelbase l, the steering ratio $i_L$, and the characteristic speed $v_{char}$ (see the following reference: Mitschke, M. Dynamik der Kraftfahrzeuge ("motor vehicle dynamics"), vol. C: Fahrverhalten ("driving behavior"), Springer-Verlag, 2nd edn. (1990) ("the Mitschke reference"), equations 9.5 and 9.6 at page 34), as follows:

$$r_{kurve} = \frac{i_L \cdot l}{\delta_{lenkung}} + \frac{i_L \cdot l \cdot v_{fzg}^2}{v_{char}^2 \cdot \delta_{lenkung}}. \quad (10)$$

As regards the roll angle, it includes a static roll angle, which is caused by or at least related to unsymmetrical loading, and a dynamic roll angle, which is caused by or at least related to the transverse acceleration and the transverse road angle. Depending on the particular application, it is believed that the static roll angle may be assumed to be zero without introducing unacceptable error, since the stabilizers may help maintain the vehicle in a relatively level orientation. The dynamic roll angle may be determined based on the track width and the vehicle's deflection displacement, which may be measured using deflection displacement sensors at the front and rear axles, and may be determined as follows:

$$\chi = \arctan\left( \frac{\Delta X_{feder}}{S_{spur}} \right), \quad (11a)$$

where $\Delta X_{feder}$ represents the difference in the deflection displacement between the two (2) wheels of one (1) axle of the vehicle. Since the vehicle may be "compressed" because of an increased wheel load on one side and may be "extended" because of a reduced wheel load on the other side, the overall "compression and extension" may be determined as follows:

$$\Delta X_{feder} = \frac{1}{C_{f\_wank}} \cdot 2 \cdot \Delta F_N, \quad (11b)$$

where $\Delta F_N$ represents the load change associated with a wheel(s). In the foregoing equation, $C_{f\_wank}$ describes or corresponds to the spring constant, which acts in the direction of the rolling motion (including the torsional rigidity of any stabilizer). The additional or differential wheel load, which is associated with a transverse force $F_{quer}$, may be determined as follows:

$$\Delta F_N = \frac{1}{2} \cdot \frac{h}{S_{spur}} \cdot F_{quer}. \quad (11c)$$

Additionally, the transverse force $F_{quer}$ may be determined, based on the transverse acceleration and the vehicle mass, as follows:

$$F_{quer} = m \cdot a_{quer} \quad (11d).$$

Based on the transverse road angle, it follows that:

$$\Delta x_{feder} = \frac{1}{C_{f-wank}} \cdot \frac{h}{S_{spur}} \cdot m \cdot g \cdot \tan(\alpha_{quer}) \cdot \cos(\alpha_{quer}). \quad (11e)$$

By making the appropriate substitutions in the above equations of 11a, 11b, 11c 11d and 11e, the total roll angle $\chi$ may be determined as follows:

$$\chi = \arctan\left(\frac{h \cdot m}{C_{f\_wank} \cdot S_{spur}^2}(a_{quer} + g \cdot \sin(\alpha_{quer}))\right). \quad (11)$$

The pitch angle $\phi$ includes a static component $\phi_{stat}$ and a dynamic component $\phi_d$:

$$\phi = \phi_{stat} + \phi_d \quad (12).$$

In particular, the static component $\phi_{stat}$ of the pitch angle $\phi$ describes or corresponds to the nature of the load, and the dynamic component $\phi_d$ of the pitch angle $\phi$ describes or corresponds to the longitudinal acceleration and the road angle. Corresponding to the procedure used for the roll angle, the components of the dynamic pitch angle are the deflection (or compression) displacement associated with the front axle, the extension travel associated with the rear axle and the wheel base length l. Accordingly, the dynamic pitch angle $\phi_d$ may be determined as follows:

$$\varphi_d = \arctan\left(\frac{2 \cdot \Delta S_{feder}}{l}\right) \quad (13)$$

$$= \arctan\left(\frac{\left(\frac{l_v}{l} + \frac{l_h}{l}\right) \cdot m \cdot \frac{h}{l}}{C_{feder} \cdot l} \cdot (-\tilde{a}_{laengs} + g \cdot \sin(\alpha_{laengs}))\right).$$

If there is no wind, the deceleration $a_{stoer}$ associated with the vehicle's air resistance may be determined as follows:

$$a_{stoer} = \frac{-F_{Lx}}{m} = -\frac{1}{m} \cdot C_w \cdot A \cdot \frac{\rho}{2} \cdot V_{fzg}^2 \quad (14)$$

(see the Mitschke reference, equation 25. 6), where "A" corresponds to the vehicle's cross-sectional area, $C_w$ corresponds to the drag coefficient, and $\rho$ corresponds to the air density.

The braking deceleration $a_{brems}$ may be determined as follows:

$$a_{brems} = -\frac{1}{m} \cdot \sum_{k=1}^{4} F_{Br_k} = -\frac{1}{m} \cdot \sum_{k=1}^{4} F_{N_k} \cdot \mu_k. \quad (15a)$$

In the linear operating range of a tire characteristic curve, the coefficient of friction, $\mu_k$, depends on the wheel slip, $\lambda_k$, and the tire's slip rigidity, $k_{Reifen}$, which is a tire-specific characteristic value that depends on or varies with the slip angle $\alpha_k$ and the wheel normal force $F_{Nk}$. During partial linear braking, in which the tires are in the linear operating range of the tire characteristic curve, the braking deceleration may be determined as follows:

$$a_{brems} = -\frac{1}{m} \cdot \sum_{k=1}^{4} F_{N_k} \cdot \lambda_k \cdot k_{Reifen}(\alpha_k, F_{N_k}), \quad (15)$$

in which the slip angle $\alpha_k$ depends on or is a function of $v_{fzg}$ and $r_{kurve}$ (see the Mitschke reference, equations 9.20 and 9.21 at page 37). Also, $\lambda_k$ is the slip of the k-th wheel and $F_{Nk}$ is the associated wheel load, which includes a static wheel load distribution component and an acceleration-dependent component. The dynamic changes in a wheel load for a wheel(s) may be determined as follows:

$$F_{Ndyn} = \pm \frac{l_{v/h}}{l} \cdot \frac{h}{l} \cdot m \cdot \tilde{a}_{laengs} \pm \frac{1}{2} \cdot \frac{h}{S_{spur}} \cdot m \cdot a_{quer}. \quad (16a)$$

Figure 3:
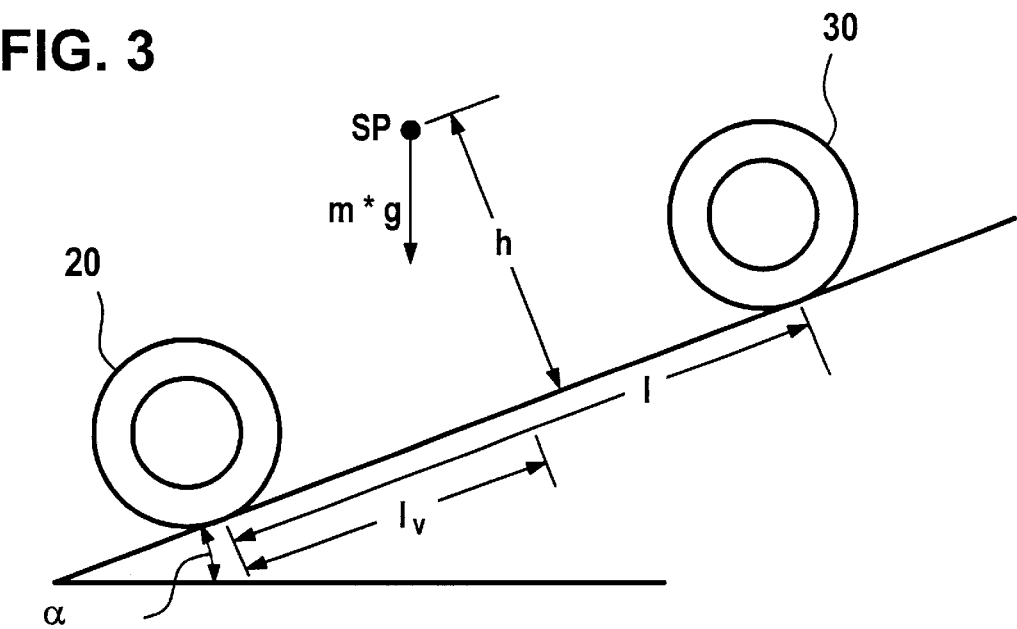
FIG. 3 shows a schematic representation of the wheel load distribution of the vehicle 10 of FIG. 2.

FIG. 3 shows a schematic representation of the wheel load distribution of the vehicle 10 of FIG. 2. In this regard, if the vehicle 10 is mapped onto a plane that has a normal line running in the direction of the vehicle's transverse axle, the static wheel load distribution component may be determined as follows:

$$F_{stat-VA/HA} = \frac{l_{h/v} \pm h \cdot \tan(\alpha_{laengs})}{l} \cdot m \cdot g \cdot \cos(\alpha_{laengs}). \quad (16b)$$

For each wheel, the static wheel load may be determined by projecting the vehicle onto the plane in the travel direction of the vehicle. To simplify the equation of 16b, it may be assumed that the center of gravity is located in the middle of the vehicle, which provides the following:

$$F_{stat} = \frac{\frac{S_{spur}}{2} \pm h \cdot \tan(\alpha_{quer})}{S_{spur}} \cdot F_{stat\_VA/HA} \cdot \cos(\alpha_{quer}). \quad (16c)$$

It therefore follows that:

$$F_N = \frac{\frac{S_{spur}}{2} \pm h \cdot \tan(\alpha_{quer})}{S_{spur}} \cdot \frac{l_{h/v} \pm h \cdot \tan(\alpha_{laengs})}{l} \cdot$$
$$m \cdot g \cdot \cos(\alpha_{laengs}) \cdot \cos(\alpha_{quer}) \pm$$
$$\frac{l_{v/h}}{l} \cdot \frac{h}{l} \cdot m \cdot \tilde{a}_{laengs} \pm \frac{1}{2} \cdot \frac{h}{S_{spur}} \cdot m \cdot a_{quer}. \quad (16)$$

The braking slip $\lambda$ may be determined as follows:

$$\lambda = 1 - \frac{V_{Rad}}{V_{nabe}}. \quad (17a)$$

Now, the wheel hub speed $V_{nabe}$ may be determined by integrating the longitudinal acceleration of the associated wheel hub. Since integration adds up any errors, the braking or wheel slip at a constant deceleration (which may be determined using the wheel speeds), may be determined as follows:

$$\lambda = 1 - \frac{a_{Rad}}{a_{nabe}}, \quad (17)$$

where the accelerations may be determined as follows:

$$a_{nabe} = a_{fzg} \pm \frac{S_{spur}}{2} \cdot \ddot{\psi}; \quad (17b)$$

$$a_{fzg} = a_{brems} + a_{stoer} + g \cdot \sin(\alpha_{laengs}) \cdot \cos(\beta) \quad (17c).$$

Also, the parameter $\tilde{a}_{fzg}$ may be determined as follows:

$$\tilde{a}_{fzg} = a_{stoer} + g \cdot \sin(\alpha_{laengs}) \cdot \cos(\beta) \quad (17d),$$

where $\tilde{a}_{fzg}$ represents the difference between $a_{fzg}$ and $a_{brems}$.

Thus, the wheel slip $\lambda_k$ for each wheel may be determined based on the determined decelerations for each wheel using equation 17, as shown above.

Thus, a total of seventeen (17) equations are available for eighteen (18) unknown parameters, which include the longitudinal road angle $\alpha_{laengs}$, the pitch angle $\phi$, the longitudinal acceleration $a_{laengs}$, the vertical acceleration $a_{vert}$, the roll angle $\chi$, the transverse road angle $\alpha_{quer}$, the transverse acceleration $a_{quer}$, the centripetal acceleration $a_{zentripetal}$, the angle $\gamma$ of the vehicle's vertical axis to the direction in which the gravitational acceleration acts, the angle $\delta_l$ of the vehicle's vertical axis to the normal line of the driving plane, the radius of curvature $r_{kurve}$, the vehicle speed $v_{fzg}$, the static pitch angle $\phi_{stat}$, the dynamic pitch angle $\phi_d$, the braking deceleration $a_{brems}$, the wheel normal force $F_{Nk}$, the braking slip $\lambda_k$, and the interference acceleration $a_{stoer}$. So that there are only seventeen (17) unknowns to be identified, the static pitch angle $\phi_{stat}$ may be considered a constant when driving, and is determined when a longitudinal deceleration $a_{laengs}$ is zero (0) (that is, for no braking, the wheel rotational speed is considered to be a constant, and a shift in the center of gravity (for example, due to a load shift) during a braking operation is not recognized).

Using this approach or method, the wheel slip(s), the road angle, the pitch angle and the roll angle may be determined using three acceleration sensors to implement a deceleration control system, which may, for example, use ESP (FDR) sensor technology (excluding the pressure sensor), especially a wheel deceleration control system for brake-by-wire systems or a brake control system.

Another approach uses a transverse acceleration sensor and a plurality of deflection displacement sensors (such as, for example, three or four spring deflection displacement sensors)—rather than the longitudinal and vertical acceleration sensors—to determine the wheel normal forces. In this case, the vehicle mass (which is not assumed to be constant as above), the wheel slip(s), the road angle, the pitch angle and the roll angle are determined based on the wheel normal forces. If a vehicle has, for example, a vehicle control system (ESP, FDR, or some other vehicle control system) having a transverse acceleration sensor and/or a vehicle headlight control system, which includes vertical aim control and two corresponding spring deflection displacement sensors, then no additional transverse acceleration sensor and only two additional deflection displacement sensors may be necessary. Additionally, if the deflection displacement associated with all four wheels may be determined, for example, with only three deflection displacement sensors, then only one (rather than two) additional spring deflection displacement sensor may be required. Thus, deflection displacement sensors may be used for all four wheels—or for only three wheels if practical, together with a transverse acceleration sensor to determine the braking or wheel slip of each of the vehicle wheels and the road angle, as well as other dynamic parameters, such as the roll angle and the pitch angle.

In particular, in this "deflection displacement sensor" approach or method, a suitably appropriate deflection displacement sensor arrangement, which may include three or four spring deflection displacement sensors, may be used to determine or measure the deflection displacement $x_{f,i}$ associated with each wheel (where i corresponds to vl (left front), vr (right front), hl (left rear), and hr (right rear)). The deflection displacement values $x_{f,i}$ may be used to determine the wheel normal forces $F_{N,i}$ as follows:

$$F_{N,i} = c_{f,i} \cdot x_{f,i} \quad (21),$$

where $c_{f,i}$ corresponds to or designates the rigidity of the suspension of each wheel. As a practical matter, however, the relationship between the deflection displacement $x_f$ and the wheel normal force $F_{N,i}$ may not be linear (that is, $c_f$ may be constant in one operating range and may depend on $x_f$ in another operating range). In such a case, the relationship beteen the deflection displacement and the wheel normal force may need to be experimentally determined for each type of vehicle. This information may then be stored as an appropriate characteristic curve. It is noted that the mathematical relationships discussed apply to a steady state system.

As mentioned, assuming that the vehicle body is sufficiently torsion-resistant, three (rather than four) deflection displacement sensors may be sufficient to determine the deflection displacement for each of the four vehicle wheels. In particular, in a torsion-resistant vehicle body, the difference in deflection displacement between the left and the right wheels is about the same on both axles (that is, $\Delta x_{f\_wank,v} \sim \Delta x_{f\_wank,h}$). Accordingly, if the deflection displacement is determined or measured for each of three wheels, for example, vl (left front), vr (right front), and hl (left rear), then the deflection displacement of hr (right rear) may be determined as follows:

$$X_{f,hr} = x_{f,hl} - \Delta x_{f\_wank,h} = x_{f,hl} - (x_{f,vl} - x_{f,vr}) \quad (21a).$$

In this case, the mass of the vehicle is not assumed to be a constant, as was assumed above, but is instead determined based on the sum of the wheel normal forces, which are based on the measured deflection displacements:

$$m = \frac{1}{g}\sum_{i=1}^{4} F_{N,i}. \tag{22}$$

The pitch angle $\phi$ and the roll angle $\chi$ may be determined based on the deflection displacement values as follows:

$$\varphi = \arctan\left(\frac{x_{f,v} - x_{f,h}}{l}\right), \tag{23}$$

where $$x_{f,v} = \frac{1}{2}(x_{f,vl} + x_{f,vr}), \text{ and } x_{f,h} = \frac{1}{2}(x_{f,hl} + x_{f,hr}); \text{ and}$$

$$\chi = \arctan\left(\frac{x_{f,l} - x_{f,r}}{S_{spur}}\right), \tag{24}$$

where $$x_{f,l} = \frac{1}{2}(x_{f,vl} + x_{f,hl}), \text{ and } x_{f,r} = \frac{1}{2}(x_{f,vr} + x_{f,hr}).$$

As before, for the transverse acceleration sensor, which is oriented in the vehicle's transverse direction:

$$a_{quer\_sensor} = g \cdot \sin(\chi + \alpha_{quer}) + a_{quer} \cdot \cos(\chi) + a_{vert} \cdot \sin(\chi) \tag{25a}.$$

By rearranging and simplifying this equation, the transverse acceleration $a_{quer}$ may be determined as follows:

$$a_{quer} = \frac{a_{quer\_sensor} - g \cdot \sin(\chi + a_{quer})}{\cos(\chi)}. \tag{25}$$

The accelerations $\tilde{a}_{laengs}$ and $a_{quer}$ may be determined as follows:

$$\tilde{a}_{laengs} = a_{brems} \cdot \cos(\beta) + a_{zentripetal} \cdot \sin(\beta) \tag{26};$$

$$a_{quer} = a_{brems} \cdot \sin(\beta) + a_{stoer} \cdot \sin(\beta) + a_{zentripetal} \cdot \cos(\beta) \tag{27}.$$

The attitude angle $\beta$ may be determined as was discussed above.

Also, as discussed above, the centripetal acceleration, based on the instantaneous speed and the radius of curvature that is traveled, may be determined as follows:

$$a_{zentripetal} = \frac{v_{fzg}^2}{r_{kurve}}. \tag{28}$$

As above, the wheel hub speed may be determined, based on the wheel speeds and the wheel slip(s), as follows:

$$v_{nabe} = \frac{1}{1-\lambda} \cdot v_{rad} \rightarrow \lambda = 1 - \frac{v_{rad}}{v_{nabe}}. \tag{29a}$$

The vehicle speed may be determined based on the wheel speeds, the braking slip(s), and the yaw speed. Accordingly, the vehicle speed at the center of gravity of the vehicle may be determined as follows:

$$v_{fzg} = \frac{1}{1-\lambda_i} \cdot v_{rad,i} \pm \frac{S_{spur}}{2} \cdot \dot{\psi} \rightarrow \lambda_i = 1 - \frac{v_{rad,i}}{v_{fzg} \pm \frac{S_{spur}}{2} \cdot \dot{\psi}}. \tag{29}$$

As before, the radius of curvature may be determined based on the vehicle speed $v_{fzg}$, the steering angle $\delta_l$, the wheelbase l, the steering ratio $i_L$, and the characteristic speed $v_{char}$, as discussed above (see the Mitschke reference, equations 9.5 and 9.6 at page 34), as follows:

$$r_{kurve} = \frac{i_L \cdot l}{\delta_l} + \frac{i_L \cdot l \cdot v_{fzg}^2}{v_{char}^2 \cdot \delta_l} = \frac{i_L \cdot l}{\delta_l} \cdot \left(1 + \frac{v_{fzg}^2}{v_{char}^2}\right). \tag{30}$$

Also, as before, the braking deceleration $a_{brems}$ may be determined as follows:

$$a_{brems} = -\frac{1}{m} \cdot \sum_{k=1}^{4} F_{Br_k} = -\frac{1}{m} \cdot \sum_{k=1}^{4} F_{N_k} \cdot \mu_k \tag{31a}$$

As discussed, in the linear range of the tire characteristic curve, the coefficient of friction $\mu$ depends on the wheel slip $\lambda_k$ and the tire's slip rigidity $k_{Reifen}$, which is a tire-specific characteristic value that may vary based on the slip angle $\alpha$ and the wheel normal force $F_N$. Accordingly, during partial linear braking, in which the tires are in the linear operating range of the tire characteristic curve, the braking deceleration $a_{brems}$ may be determined as follows:

$$a_{brems} = -\frac{1}{m} \cdot \sum_{k=1}^{4} F_{N_k} \cdot \lambda_k \cdot k_{Reifen}(\alpha_k, F_{N_k}), \tag{31}$$

in which the slip angle $\alpha_k$ depends on $v_{fzg}$ and $r_{kurve}$ (see the Mitschke reference at page 37 (equations 9.20 and 9.21)), $\lambda_k$ is the slip of the k-th wheel and $F_{Nk}$ is the associated wheel load.

The difference in deflection displacement in the vehicle's transverse direction $\Delta x_{f\_wank} = x_{f,l} - x_{f,r}$ may be separated into a static component $\Delta x_{f\_wank\_stat}$, which is associated with loading on one side, and a dynamic component $\Delta x_{f\_wank\_d}$, which is associated with the transverse road angle $\alpha_{quer}$ and with the transverse acceleration $a_{quer}$ that is exerted at the vehicle's center of gravity "SP":

$$\Delta x_{f\_wank} = \Delta x_{f\_wank\_stat} + \Delta x_{f\_wank\_d} \tag{32a}.$$

Since the static component $\Delta x_{f\_wank\_stat}$ may be relatively small, it may be assumed to be zero to simplify the equation, which provides the following:

$$\Delta x_{f\_wank} = \Delta x_{f\_wank\_d} = \frac{2 \cdot (\Delta F_{N,quer} + \Delta F_{N,neig})}{C_{f\_wank}}. \tag{32b}$$

The variable $C_{f\_wank}$ corresponds to or describes the spring force constant acting in a rolling motion (including the torsional rigidity of the vehicle stabilizer). As a practical matter, if $C_{f\_wank}$ is not essentially a constant, then it may need to be experimentally determined and stored as a characteristic curve.

The change in wheel load $\Delta F_{N,quer}$ that is associated with the transverse acceleration may be determined as follows:

$$\Delta F_{N,quer} = \frac{1}{2} \cdot \frac{h}{S_{spur}} \cdot m \cdot a_{quer}. \qquad (32c)$$

A transverse road angle may be associated with a change in a wheel load $\Delta F_{N,neig}$, which may be determined as follows:

$$\Delta F_{N,neig} = \frac{1}{2} \cdot \frac{h}{S_{spur}} \cdot m \cdot g \cdot \tan(\alpha_{quer}) \cdot \cos(\alpha_{quer}). \qquad (32d)$$

Accordingly, the difference in deflection displacement in the vehicle's transverse direction $\Delta F_{N,wank}$ may be determined as follows:

$$\Delta x_{f\_wank} = \frac{h \cdot m \cdot a_{quer} + h \cdot m \cdot g \cdot \sin(\alpha_{quer})}{C_{f\_wank} \cdot S_{spur}}. \qquad (32e)$$

By rearranging this equation, the transverse road angle $\alpha_{quer}$ may be determined as follows:

$$\alpha_{quer} = \arcsin\left(\frac{1}{g}\left(\Delta X_{f,wank} \cdot \frac{C_{f\_wank} \cdot S_{spur}}{h \cdot m} - a_{quer}\right)\right). \qquad (32)$$

The difference in deflection displacement in the vehicle's longitudinal direction $\Delta x_{f\_nick}$, which includes a static component $\Delta x_{f\_nick\_stat}$ and a dynamic component $\Delta x_{f\_nick\_d}$, may be determined as follows:

$$\Delta X_{f\_nick} = \Delta X_{f\_nick\_stat} + \Delta X_{f\_nick\_d} \qquad (33).$$

The dynamic difference in deflection displacement in the vehicle's longitudinal direction $\Delta x_{f\_nick\_d}$ is associated with the longitudinal acceleration $\tilde{a}_{laengs}$ and the longitudinal road angle $\alpha_{laengs}$.

Like the method that was used to determine the difference in deflection displacement in the vehicle's transverse direction, the dynamic component of the difference in deflection displacement in the vehicle's longitudinal direction $\Delta x_{f\_nick\_d}$ may be similarly determined as follows:

$$\Delta X_{f\_nick\_d} = \left(\frac{l_v}{l \cdot C_{f\_v}} + \frac{l_h}{l \cdot C_{f\_h}}\right) \cdot m \cdot \frac{h}{l} \cdot \qquad (34a)$$
$$(-\tilde{a}_{laengs} + g \cdot \sin(\alpha_{laengs})).$$

By rearranging this equation, the longitudinal road angle $\alpha_{laengs}$ may be determined as follows:

$$\alpha_{laengs} = \arcsin\left(\frac{1}{g}\left(\Delta X_{f\_nick\_d} \cdot \frac{C_{f\_v} \cdot C_{f\_h}}{l_v \cdot C_{f\_h} + l_h \cdot C_{f\_v}} \cdot \frac{l^2}{m \cdot h} + \tilde{a}_{laengs}\right)\right). \qquad (34)$$

By differentiating equation 29 with respect to time and assuming that the wheel slip $\lambda_k$ is constant for a relevant period of time, the vehicle acceleration $a_{fzg}$ may be determined as follows:

$$a_{fzg} = \dot{v}_{fzg} = \frac{1}{1 - \lambda_i} \cdot \dot{v}_{rad,i} \pm \frac{S_{spur}}{2} \cdot \ddot{\psi}, \qquad (35a)$$

and the vehicle deceleration $\alpha_{fzg}$ may be determined as follows:

$$a_{fzg} = a_{brems} + a_{stoer} + g \cdot \sin(\alpha_{laengs}) \cdot \cos(\beta) \qquad (35b).$$

Accordingly, since the vehicle's deceleration is known, rearranging equation 35a provides that the wheel slip $\lambda_k$ for each wheel may be determined as follows:

$$\lambda_i = 1 - \frac{\dot{v}_{rad,i}}{a_{fzg} \mp \frac{S_{spur}}{2} \cdot \ddot{\psi}}. \qquad (35)$$

Thus, a total of fifteen (15) equations provide the wheel normal force $F_N$, the vehicle mass m, the pitch angle φ, the roll angle χ, the longitudinal acceleration $a_{laengs}$, the transverse acceleration $a_{quer}$, the interference acceleration $a_{stoer}$, the centripetal acceleration $a_{zentripetal}$, the radius of curvature $r_{kurve}$, the vehicle speed $v_{fzg}$, the transverse road angle $\alpha_{quer}$, the longitudinal road angle $\alpha_{laengs}$, the static difference in deflection displacement $\Delta x_{f\_nick\_stat}$, the dynamic difference in deflection displacement $\Delta x_{f\_nick\_d}$, the braking deceleration $a_{brems}$, and the braking or wheel slip $\lambda_k$. So that there are fifteen (15) unknowns to be determined, the static difference in deflection displacement $\Delta x_{f\_nick\_stat}$ during a braking operation may be considered a constant. In particular, the static difference in deflection displacement $\Delta x_{f\_nick\_stat}$ is determined for when the longitudinal deceleration $a_{laengs}$ is zero (0) (that is, for no braking, the wheel rotational speed is a constant, and a shift in the center of gravity (for example, due to a shifting vehicle load) during a braking operation is not considered).

Using this approach or method, the wheel normal forces, the vehicle mass, the wheel slip(s), the road angle, the pitch angle and the roll angle may be determined using a transverse acceleration sensor and three or four deflection displacement sensors to implement a deceleration control system, which may, for example, use ESP (FDR) sensor technology (excluding the pressure sensor), especially a wheel deceleration control system for brake-by-wire systems. In such a case, the vehicle mass is not assumed to be constant, but may be determined using the deflection displacement sensors so that the wheel normal forces are not estimated based on a constant vehicle mass, but are instead determined based on the deflection displacement measurements. It is believed that this should provide a more accurate system.

Figure 4:
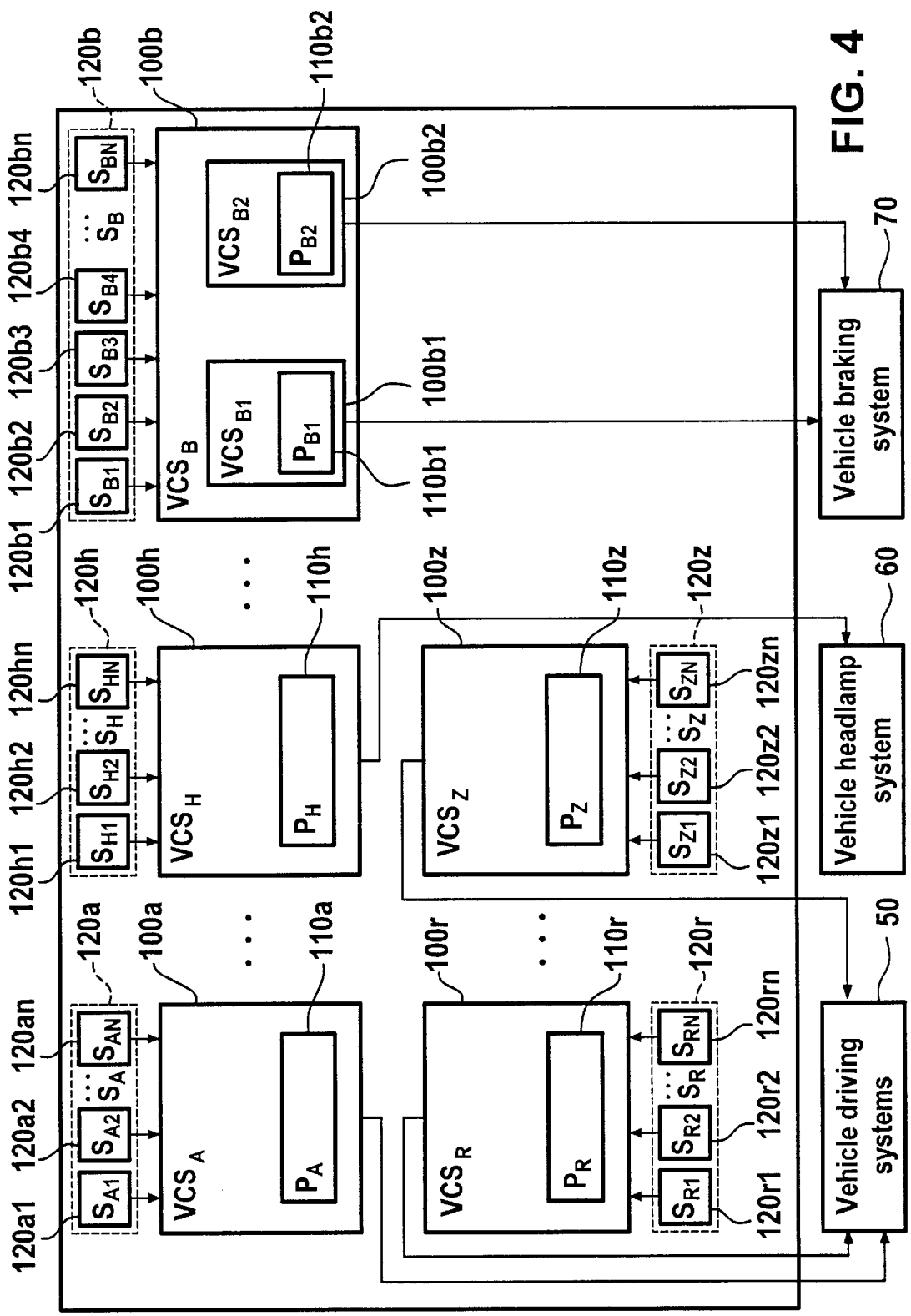
FIG. 4 shows a total vehicle control system 1 that may include a number of vehicle control subsystems or systems $VCS_A$, $VCS_B$, ..., $VCS_H$, ..., $VCS_R$, ..., $VCS_Z$(100a, 100b, ..., 100h, ..., 100r, ..., 100z) that may be used to implement the methods of FIG. 5, FIG. 6, FIG. 7 and/or FIG. 8.

As regards the "acceleration sensor" method and the "deflection displacement sensor" method described above, one embodiment of a total vehicle control system 1, which may use these methods to determine the wheel slip, the road angle and/or other dynamic parameters, is shown in FIG. 4. In particular, FIG. 4 shows a total vehicle control system 1 that may include a number of vehicle control subsystems or systems $VCS_A$, $VCS_B$, . . . , $VCS_H$, . . . , $VCS_R$, . . . , $VCS_Z$ (100a, 100b, . . . , 100h, . . . , 100r, . . . , 100z). The vehicle control system $VCS_A$ (100a) may, for example, correspond to an active vehicle control system, which may include a vehicle stability program control system (ESP, FDR or some other vehicle control system) and various sensors, including a transverse acceleration sensor, for maintaining the stability of a vehicle during certain driving conditions by controlling certain vehicle driving systems 50, which may include, for example, acceleration, braking, suspension and steering systems. The vehicle control system $VCS_H$(100h) may, for example, correspond to a vehicle headlamp control system for controlling a vehicle headlight system 60, and if it includes vertical aim control, it may determine the displacement of the front and rear of the vehicle, as measured, for example, by two (2) deflection displacement sensors. The vehicle control system $VCS_R$ (100r) may, for example, correspond to a vehicle roll-stability control system (such as EAS) for maintaining the roll stability of a vehicle during certain driving conditions, which may also provide various control signals to control certain vehicle operations 50 that affect the roll stability of a vehicle. The vehicle control system $VCS_Z$ (100z) may be some other vehicle control system, such as an active-handling control system, an electronic drive train control system (such as ACC), a traction control system or some other vehicle control system, which may provide various control signals for controlling acceleration, braking, steering, suspension and other vehicle driving systems 50. Finally, the vehicle control system $VCS_B$ (100b) may be a brake control system, which, for example, include a brake force or torque control system $VCS_{B1}$ (100b1) and a deceleration control system $VCS_{B2}$ (100b2), which may be used to control a brake-by wire system 70. The brake-by wire system 70 may, for example, be an electro-mechanical brake system or an electro-hydraulic brake system.

Additionally, each of the vehicle control systems $VCS_A$, $VCS_B, \ldots, VCS_H, \ldots, VCS_R, \ldots, VCS_Z$ (100a, 100b, ..., 100h, ..., 100r, ..., 100z) may have its own processor or may share a processor with one of the other vehicle control systems. The processor may be any suitably appropriate processor, and may, for example, be a microcontroller, a microprocessor, an ASIC processor or some other processor. Processors $P_A, P_B, \ldots, P_H, \ldots, P_R, \ldots, P_Z$ (110a, 110b, ..., 110h, ..., 110r, ..., 110z) are shown in each of the vehicle control systems $VCS_A, VCS_B, \ldots, VCS_H, \ldots, VCS_R, \ldots, VCS_Z$ (100a, 100b, ..., 100h, ..., 100r, ..., 100z). In particular, the processor $P_B$ may be a processor $P_{B1}$ (110b1) and a processor $P_{B2}$ (110b2) as shown in FIG. 4. In particular, the processor $P_B$ may be a processor $P_{B1}$ (110b1) and a processor $P_{B2}$ (110b2) that are used to implement or program, respectively, the slip control method and/or the deceleration control method discussed below for either the "acceleration sensor" embodiment or the "deflection displacement sensor" embodiment, as discussed above.

Additionally, each of the vehicle control systems $VCS_A$, $VCS_B, \ldots, VCS_H, \ldots, VCS_R, \ldots, VCS_Z$ (100a, 100b, ..., 100h, ..., 100r, ..., 100z) may include a corresponding sensor arrangement. These sensor arrangements may includes for example, a sensor arrangement $S_A$ (120a) having sensors $S_{A1}, SA_2, \ldots, SA_n$ (120a1, 120a2, ..., 120an), a sensor set $S_B$ (120b) having sensors $S_{B1}, S_{B2}, \ldots, S_{Bn}$ (120b1, 120b2, ..., 120bn), a sensor set $S_H$ (120h) having sensors $S_{H1}, S_{H2}, \ldots S_{Hn}$ (120h1, 120h2, ..., 120hn), and a sensor set $S_Z$ (120n) having sensors $S_{Z1}, S_{Z2}, \ldots, S_{Zn}$ (120z1, 120z2, ..., 120zn). Additionally, depending on the particular application and the various cost and design considerations of the vehicle control systems, some of the sensors may be shared so that there is no unnecessary duplication of sensors that are used to measure the same parameters for different vehicle control systems. Thus, sensor $S_{A1}$ (120a1) may, for example, correspond to or be the same sensor as sensor $S_{B1}$ (120b1). Also, for example, the active vehicle control system $VCS_A$ (100a) may have a sensor set $S_A$ (120a) that includes a transverse acceleration sensor, such as $S_{A1}$ (120a1), which may also be used by the deceleration control system $VCS_{B2}$ (100b2) (or a wheel slip brake control system, as discussed below) of the vehicle brake control system $VCS_B$ (100b). Additionally, as mentioned above, the vehicle headlamp control system $VCS_H$ (100h) may have a sensor set $S_H$ (120h) that includes two deflection displacement sensors $S_{H1}$ (120h1) and $S_{H2}$ (120h2), such as spring deflection displacement sensors, which may also be used by the deceleration control system $VCS_{B2}$ (100b2) of the vehicle brake control system $VCS_B$ (100b).

Figure 5:
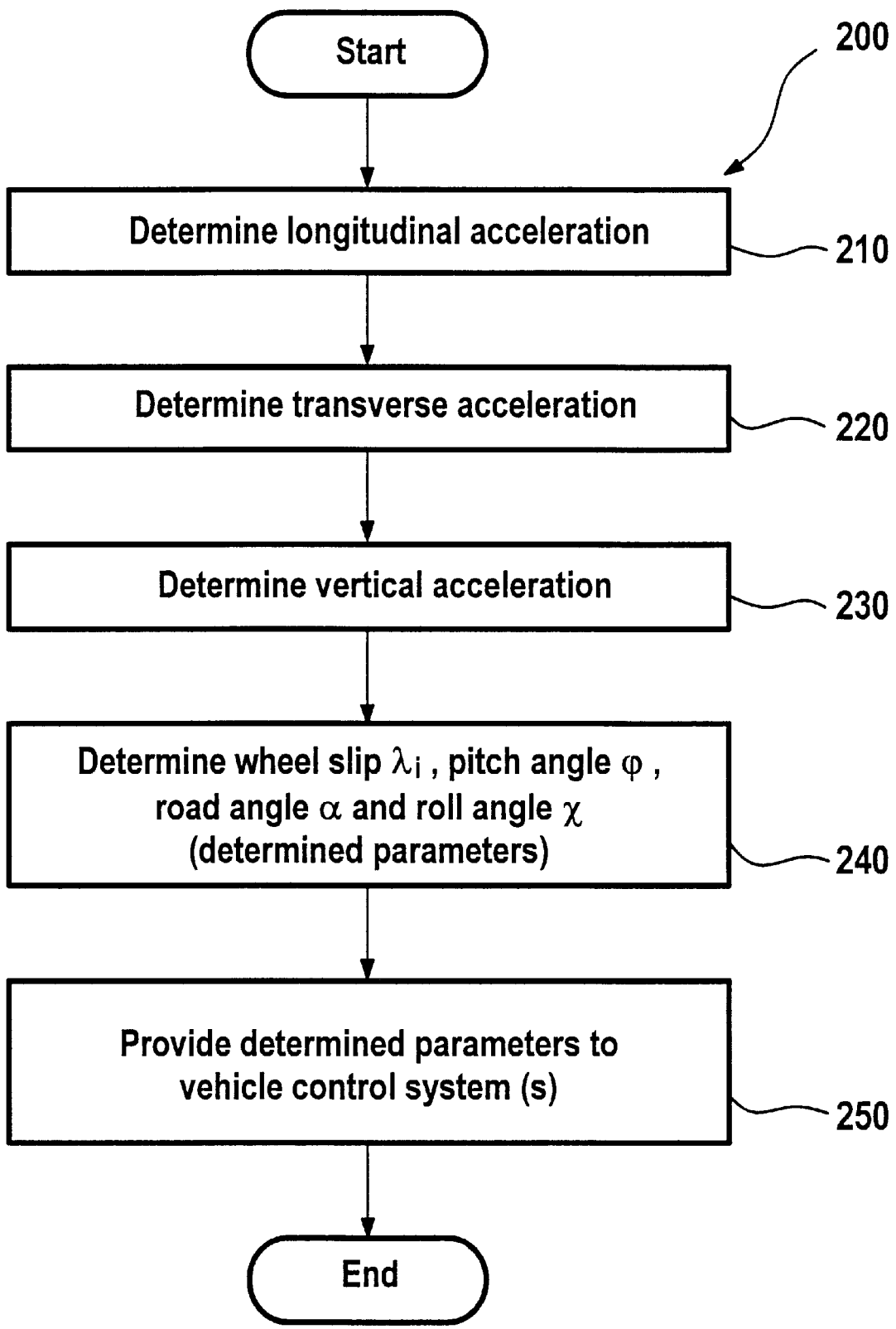
FIG. 5 shows an acceleration sensor method for determining the vehicle wheel slip(s) and other vehicle dynamic parameters, including the road angle.

In the logic flowchart of FIG. 5, an "acceleration sensor" method 200 is shown for determining the vehicle wheel slip(s) and other vehicle dynamic parameters, including the road angle. In the case of the acceleration sensor method 200 of FIG. 5, the braking system sensors $S_{B1}$ (120b1), $S_{B2}$ (120b2) and $S_{B3}$ (120b3) may be a longitudinal acceleration sensor, a transverse acceleration sensor and a vertical acceleration sensor, or some other suitably appropriate acceleration sensor arrangement, to implement the slip control braking method and/or the deceleration control method in the vehicle control braking system $VCS_B$ (100b).

As regards FIG. 5, the processor $P_B$ (110b) (which may be the processor $P_{B1}$ (110b1) and/or the processor $P_{B2}$ (110b2)) may be used to implement or program the acceleration sensor embodiment or method 200 of FIG. 5, which may then be used, for example, for the deceleration control method 400 of FIG. 7 and/or the slip control method 500 of FIG. 8 (as discussed below). First, in step 210, the processor determines the longitudinal acceleration. In step 220, the processor determines the transverse acceleration. In step 230, the processor determines the vertical acceleration. Steps 210 to 230 may, of course, be done concurrently. Next in step 240, the processor determines the wheel slip(s), the pitch angle, the road angle and the roll angle, as well as other vehicle dynamic parameters, as discussed above. Finally, in step 250, the processor provides or otherwise makes available (for example, providing the information to a memory) the determined parameters to one or more vehicle control systems $VCS_A, VCS_B, \ldots, VCS_H, \ldots, VCS_R, \ldots, VCS_Z$ (100a, 100b, ..., 100h, ..., 100r, ..., 100z).

In the logic flowchart of FIG. 6, a "deflection displacement" sensor method 300 is shown for determining vehicle wheel slip(s) and other vehicle dynamic parameters, including the wheel normal forces and the vehicle mass. In the case of the deflection displacement sensor method 300 of FIG. 6, the braking system sensors $S_{B1}$ (120b1), $S_{B2}$ (120b2), $S_{B3}$ (120b3) and $S_{B4}$ (120b4) may be one or more (at least up to four) spring deflection displacement sensors for each vehicle wheel, as discussed above, or some other suitably appropriate deflection displacement sensor arrangement, to implement the slip control braking method and/or the deceleration control method in the vehicle control braking system $VCS_B$ (100b).

As regards FIG. 6, the processor $P_B$ (which may be the processor $P_{B1}$ (110b1) and/or the processor $P_{B2}$ (110b2)) may be used to implement or program the acceleration sensor embodiment or method 300 of FIG. 6, which may then be used, for example, for the deceleration control method 400 of FIG. 7 and/or the slip control method 500 of FIG. 8 (as discussed below). First, in step 310, the processor determines the transverse acceleration. In step 320, the processor determines a plurality of vehicle deflection displacements. Next, in step 330, the processor determines the wheel normal forces and the vehicle mass, as described above. In step 340, the processor determines the wheel slip(s), the pitch angle, the road angle and the roll angle, as well as other vehicle dynamic parameters, as discussed above. Finally, in step 350, the processor provides or otherwise makes available (for example, providing the information to a memory) the determined parameters to one or more vehicle control systems $VCS_A, VCS_B, \ldots, VCS_H, \ldots, VCS_R, \ldots, VCS_Z$ (100a, 100b, ..., 100h, ..., 100r, ..., 100z).

Thus, the above apparatuses, methods and systems may be used to determine the braking slip value(s) or factor(s) and the road-angle, as well as the pitch angle, the roll angle, as well as other vehicle dynamic parameters, by using either a suitably appropriate acceleration sensor arrangement, which may be three (or two) additional acceleration sensors (each of which sense a parameter corresponding to an acceleration), or a suitably appropriate deflection displacement sensor arrangement, which may be four (or which, for example, may be as few as three, two or even one) additional deflection displacement sensors. In either case, the actual number of sensors used or the number of additional sensors required (whether acceleration sensors or deflection displacement sensors) will depend on the particular vehicle control systems that are available to share such sensors, as discussed above.

As discussed, when working with a deceleration control system for a brake-by-wire system, whether an electromechanical braking system or an electro-hydraulic braking system, it is believed that a fixed value corresponding to a wheel deceleration setpoint may not correspond to a particular level of brake-pedal travel or brake-pedal force that corresponds with the experience or experiential frame of reference of the driver. For example, when a driver is driving down a hill, the driver may also achieve wheel acceleration even while depressing the brake pedal. Of course, such wheel acceleration is still less than the wheel acceleration that may result without actuating or depressing the brake pedal. By increasing pressure on the brake pedal, this should reduce wheel acceleration down to zero (0) and eventually make it negative so that there is wheel deceleration, rather than wheel acceleration. By using the above apparatuses, methods and/or systems, this braking behavior may be simulated by determining an unbraked wheel acceleration during a braking operation, and adding it as an offset to a characteristic curve of a brake pedal for a driver, including during a braking operation. In particular, during braking, the processor $P_{B2}$ (110$b$2) may be used to determine the unbraked wheel acceleration based on the wheel slip and the road angle relative to a horizontal level, as well as the other dynamic parameters, that may be determined as discussed above. For example, the processor $P_{B2}$ (110$b$2) may be used to determine the vehicle speed based on the wheel speed(s) and the determined wheel slip(s) (as determined above).

In the logic flowchart of FIG. 7, a braking deceleration method 400 is shown for determining the unbraked wheel deceleration, which may be based on either of the methods or systems of FIG. 5 and FIG. 6. In particular, the processor $P_{B2}$ (110$b$2) may, for example, be used to implement or program the deceleration control method 400 of FIG. 7. First, in step 410, the processor determines the braking deceleration. In step 420, the processor determines the interference deceleration. In step 440, the processor determines the unbraked wheel acceleration based on steps 410 to 430. In step 450, the processor either adds the unbraked wheel acceleration as an offset to a "deceleration pedal" or brake-pedal characteristic curve or provides (or otherwise makes available (for example, providing the information to a memory)) the determined parameters, including the unbraked wheel deceleration offset, to the vehicle control system $VCS_{B2}$ (100$b$2) for controlling wheel deceleration and the vehicle brake system 70 based on the adjusted "deceleration pedal" characteristic curve and/or the unbraked wheel deceleration in step 460.

Additionally, the processor $P_{B1}$ (110$b$1) may be used to implement an anti-lock braking apparatus or system that determines the braking or wheel slip(s) that wheel lock or slip may be appropriately controlled, and it may do this by comparing the determined vehicle speed and the determined wheel speeds, which the processor determines based on the methods discussed above. As discussed, the determined vehicle speed may also be differentiated to obtain vehicle acceleration or deceleration, and if any wheel(s) exceeds or drops below some predetermined velocity rate and/or acceleration rate, the processor $P_{B1}$ (100$b$1) may apply a correcting control signal to the braking system 70 so as to compensate for any wheel locking or slipping. Accordingly, by using the present apparatuses, methods or system, a more accurate vehicle speed or velocity may be determined based on the wheel slip(s), and it is believed that this should provide a more accurate or efficient anti-lock braking control system. The acceleration sensors should, of course be selected so that they are sufficiently accurate to implement the foregoing slip control method in the partial linear braking range, as discussed.

In the logic flowchart of FIG. 8, a wheel slip brake control method 500 is shown for controlling the vehicle brake system 70 by determining the wheel slip(s) and the wheel speed(s), which may be based on either of the methods or systems of FIG. 5 and FIG. 6, as discussed above. In particular, the processor $P_{B1}$ (110$b$1) may, for example, be used to implement or program the slip control method 500 of FIG. 8. First, in step 520, the processor determines or otherwise obtains the wheel slip(s) from either of the methods or systems of FIG. 5 or FIG. 6. In step 540, the processor determines the vehicle speed based on the wheel slip(s) and the wheel speed(s). In step 560, the processor provides the vehicle speed and/or the wheel slip(s) to an "ABS" processor or system, such as $VCS_{B1}$ (100$b$1), which may then be used to control any wheel brake lock and/or wheel slip(s) based on the vehicle speed and/or the wheel slip(s) in step 580.

Also, of course, the additional information, such as the pitch angle, the roll angle, the longitudinal acceleration, the transverse acceleration, and the road angle to horizontal may be provided or otherwise made available to other vehicle control systems, such as, for example, an active-handling control system, an electronic drive train control system (such as ACC), a roll stabilization control system (such as EAS), a traction control system or some other vehicle dynamics control system (such as ESP or FDR).

In summary, a transverse (yaw) acceleration (or velocity) and either the longitudinal and vertical accelerations or the determined deflection displacements the vehicle wheel(s) may be used to determine the following:

The unbraked wheel acceleration/deceleration $a_{fzg}$ may be determined and added to a brake-pedal characteristic curve as an offset to obtain the "normal" brake system behavior for a particular driver. In particular, the vehicle deceleration $a_{fzg}$ may be determined based on a braking deceleration $a_{brems}$, an interference deceleration $a_{stoer}$ (corresponding to an aerodynamic drag and a tire rolling resistance) and a downgrade force, as follows:

$$a_{fzg} = a_{brems} + a_{stoer} + g \cdot \sin(\alpha_{laengs}) \cdot \cos(\beta)$$

Additionally, the unbraked wheel acceleration $a_{nabe}$ (based on the unbraked vehicle acceleration $a_{fzg}$ and the yaw acceleration) may be determined as follows:

$$a_{nabe} = a_{fzg} \mp \frac{S_{spur}}{2} \cdot \ddot{\psi},$$

where the unbraked vehicle acceleration $a_{fzg}$ may correspond to $\tilde{a}_{fzg}$ that represents the difference between $a_{fzg}$ and $a_{brems}$, which may be determined as follows:

$$a_{brems} = -\frac{1}{m} \cdot \sum_{k=1}^{4} F_{N_k} \cdot \lambda_k \cdot k_{Reifen}(\alpha_k, F_{N_k}).$$

Also, in the "deflection displacement sensor" approach or method, the wheel contact forces may be based on a vehicle mass that is determined based on the measured deflection displacements—rather than being based on an assumed vehicle mass, as with the "acceleration sensor" method. Finally, the brake or wheel slip(s), which may be based on the wheel deceleration and the vehicle deceleration, may be used to provide slip control for an anti-lock braking system.

What is claimed is:

1. An apparatus for determining at least one wheel slip (s) of a vehicle (10) and at least one of a pitch angle (ϕ), a road angle and a roll angle (χ) of the vehicle for use in at least one vehicle control system (1), characterized in that the apparatus includes:
at least three deflection displacement sensing devices that are adapted for sensing a first parameter that corresponds to a first deflection displacement, a second parameter that corresponds to a second deflection displacement, and at least a third parameter that corresponds to a third deflection displacement; and
a processor ($P_B$) for determining the at least one wheel slip (s) of the vehicle and the at least one of the pitch angle, the road angle and the roll angle based on the first deflection displacement, the second deflection displacement, and the third deflection displacement.

2. The apparatus as defined in claim 1, characterized in that the at least one vehicle control system (1) is at least one of an active-handling control system, an anti-lock brake control system, an acceleration control system, a deceleration control system, a drive-train control system, a roll-stability control system, a traction control system, a vehicle stability control system and a vehicle dynamics control system.

3. The apparatus as defined in claim 1, characterized in that the at least one vehicle control system (1) includes an anti-lock brake control system that controls a brake system based on at least one of a vehicle velocity ($v_{fzg}$) and the at least one wheel slip (s), and further characterized in that the processor ($P_B$) determines the at least one wheel slip (s) and determines a vehicle velocity ($v_{fzg}$) based on the at least one wheel slip (s).

4. The apparatus as defined in claim 1, characterized in that the apparatus includes a sensing device that is adapted to sense a first parameter that corresponds to a transverse acceleration of the vehicle (10), and further characterized in that the processor determines the at least one wheel slip (s) of the vehicle (10) and the at least one of the pitch angle (ϕ), the road angle and the roll angle (χ) based on the transverse acceleration.

5. The apparatus as defined in claim 4, characterized in that the sensing device is a transverse acceleration sensor.

6. The apparatus as defined in claim 1, characterized in that the at least one vehicle control system (1) includes a deceleration control system, having a braking characteristic curve, that controls a brake system based on at least one of the braking characteristic curve and an unbraked wheel acceleration, and further characterized in that the processor ($P_B$) determines an unbraked wheel acceleration during a braking operation, and adds the unbraked wheel acceleration as an offset to the braking characteristic curve.

7. The apparatus as defined in claim 6, characterized in that the processor ($P_B$) determines the road angle and determines the unbraked wheel acceleration based on at least a vehicle velocity $v_{fzg}$) and the road angle.

8. The apparatus as defined in claim 7, characterized in that the processor ($P_B$) determines the vehicle velocity ($v_{fzg}$) based on the at least one wheel slip (s).

9. The apparatus as defined in claim 1, characterized in that the processor provides the at least one wheel slip (s) of the vehicle (10) and the at least one of the pitch angle (ϕ), the road angle, and the roll angle (χ) of the vehicle (10) to the at least one vehicle control system (1).

10. An apparatus for determining at least one wheel slip (s) of a vehicle (10) and at least one of a pitch angle (ϕ), a road angle and a roll angle (χ) of the vehicle (10) for use in at least one vehicle control system(1), including a deceleration control system, which has a braking characteristic curve, that controls a brake system based on at least one of the braking characteristic curve and an unbraked wheel acceleration, characterized in that the apparatus includes:
means for sensing a first parameter that corresponds to a first deflection displacement, a second parameter that corresponds to a second deflection displacement, and at least a third parameter that corresponds to at least a third deflection displacement;
means for determining the at least one wheel slip (s) based on at least one of first deflection displacement, the second deflection displacement, and the third deflection displacement;
means for determining the at least one wheel slip (s) based on at least one of first deflection displacement, the second deflection displacement, and the third deflection displacement;
means for determining the road angle and at least one of the pitch angle and the roll angle (χ) based on at least one of first deflection displacement, the second deflection displacement, and the third deflection displacement; and
means for determining an unbraked wheel acceleration during a braking operation and adding the unbraked wheel acceleration as an offset to the braking characteristic curve.

11. The apparatus as defined in claim 10, characterized in that the apparatus includes means for providing the at least one wheel slip (s) of the vehicle (10) and the at least one of the pitch angle (ϕ), the road angle, and the roll angle of the vehicle (10) to the at least one vehicle control system.

12. The apparatus as defined in claim 10, characterized in that the means for determining the unbraked wheel acceleration determines the unbraked wheel acceleration based on at least a vehicle velocity ($v_{fzg}$) and the road angle.

13. The apparatus as defined in claim 12, characterized in that the apparatus includes means for determining the vehicle velocity ($v_{fzg}$) based on the at least one wheel slip (s).

14. The apparatus as defined in claim 1, characterized in that the processor ($P_B$) determines at least one wheel normal force and a vehicle mass (m) based on the at least one wheel normal force.

15. A method for determining at least one wheel slip (s) of a vehicle (10) and at least one of a pitch angle(ϕ), a road angle and a roll angle (χ) for use in at least one vehicle control system (1), characterized in that the method includes the steps of:
determining a first deflection displacement;
determining a second deflection displacement;
determining a third deflection displacement; and
determining the at least one wheel slip (s) of the vehicle (10) and the at least one of the pitch angle (ϕ), the road angle and the roll angle ($\chi$) based on the first deflection displacement, the second deflection displacement, and the third deflection displacement.

16. The method as defined in claim 15, characterized in that the at least one vehicle control system (1) is at least one of an active-handling control system, an anti-lock brake control system, an acceleration control system, a deceleration control system, a drive-train control system, a roll-stability control system, a traction control system, a vehicle stability control system and a vehicle dynamics control system.

17. The method as defined in claim 15, characterized in that the at least one vehicle control system (1) includes an anti-lock brake control system that controls a brake system based on at least one of a vehicle velocity ($v_{fzg}$) and the at least one wheel slip (s), and further characterized in that the method includes the steps of: determining the at least one wheel slip (s); and determining a vehicle velocity ($v_{fzg}$) based on the at least one wheel slip (s).

18. The method as defined in claim 15, characterized in that the at least one vehicle control system (1) includes a deceleration control system, having a braking characteristic curve, that controls a brake system based on at least one of the braking characteristic curve and an unbraked wheel acceleration, and further characterized in that the method includes the steps of: determining an unbraked wheel acceleration during a braking operation; and adding the unbraked wheel acceleration as an offset to the braking characteristic curve.

19. The method as defined in claim 18, characterized in that the method includes the steps of: determining the road angle; and determining the unbraked wheel acceleration based on at least a vehicle velocity ($v_{fzg}$) and the road angle.

20. The method as defined in claim 19, characterized in that the method includes the step of determining the vehicle velocity ($a_{fzg}$) based on the at least one wheel slip (s).

21. The method as defined in claim 10, characterized in that the method includes the step of providing the at least one wheel slip (s) of a vehicle (10) and the at least one of the pitch angle ($\phi$), the road angle, and the roll angle ($\chi$) of the vehicle (10) to the at least one vehicle control system.

22. The method as defined in claim 15, 16, 17, 18, 19, 20, or 21, characterized in that the method includes the steps of: determining at least one wheel normal force; and determining a vehicle mass (m) based on the at least one wheel normal force.

* * * * *

UNITED STATES PATENT AND TRADEMARK OFFICE
CERTIFICATE OF CORRECTION

PATENT NO. : 6,374,171 B2
DATED : April 16, 2002
INVENTOR(S) : Reinhard Weiberle et al.

It is certified that error appears in the above-identified patent and that said Letters Patent is hereby corrected as shown below:

<u>Column 24,</u>
Line 18, delete "16, 17, 18, 19, 20, or 21".

Signed and Sealed this

Nineteenth Day of August, 2003

JAMES E. ROGAN
*Director of the United States Patent and Trademark Office*